United States Patent [19]

Yamaki

[11] Patent Number: 4,647,171
[45] Date of Patent: Mar. 3, 1987

[54] FULLY AUTOMATIC DIAPHRAGM CONTROL INTERCHANGEABLE LENS

[75] Inventor: Michihiro Yamaki, Tokyo, Japan
[73] Assignee: Sigma Corporation, Tokyo, Japan
[21] Appl. No.: 734,608
[22] Filed: May 16, 1985
[30] Foreign Application Priority Data May 16, 1984 [JP] Japan ................................. 59-96660

[51] Int. Cl.[4] ............................................... G03B 7/20
[52] U.S. Cl. ................................ 354/286; 354/289.12
[58] Field of Search ............... 354/286, 289.1, 289.12, 354/455, 270, 271.1, 273; 350/257

[56] References Cited

U.S. PATENT DOCUMENTS 4,104,649 8/1978 Tanaka et al. .................. 354/286 X
4,357,089 11/1982 Okura et al. ........................ 354/286
4,360,255 11/1982 Kawasaki ........................ 354/286 X

*Primary Examiner*—William B. Perkey
*Attorney, Agent, or Firm*—Brisebois & Kruger

[57] ABSTRACT

An interchangeable variable aperture lens can be used as an automatic lens with a camera body using digital signal control and with a camera body using analog signal control, and as a manual lens. The lens has both digital and analogue circuits for providing signals, to different camera bodies, indicative of the full open and full closed values of the lens diaphragm. Digital and analogue signal contacts are so positioned on the lens that the coacting contacts of different camera bodies are engaged when the lens is mounted on the different bodies, provided that the mechanical mount is the same.

7 Claims, 7 Drawing Figures

FULLY AUTOMATIC DIAPHRAGM CONTROL INTERCHANGEABLE LENS

This invention relates generally to fully automatic diaphragm control interchangeable lenses, and particularly to a fully automatic diaphragm control lens which can be used with various types of interchangeable lens cameras.

BACKGROUND OF THE INVENTION

Many different types of interchangeable lens cameras are presently available. Different manufacturers of cameras have, in the past, used different mounting arrangements for the interchangeable lenses, usually to preserve the individuality of their cameras and lenses. As a result, if the owner of a camera body and a series of lenses which fit the body decides to obtain a new body with a different mount, the old lenses cannot be used with the new camera body.

In addition, the trend in cameras has been towards full automation of the picture taking process including modes of operation such as shutter priority automatic exposure, aperture priority automatic exposure, and programmed automatic exposure. In each of these automatic modes of operation, it is necessary for the camera body to automatically set the diaphragm or lens aperture either to the selected value in the case of aperture priority (and then set the shutter speed for proper exposure), or to automatically set the diaphragm to a computed value based on shutter speed in the case of shutter priority, or based on a computed value in the case of programmed automatic exposure. For such automatic operation, most automatic lenses are provided with a diaphragm lever which is operated by a diaphragm control lever on the camer body.

For certain types of photography, and with certain cameras, it is possible to manually set the diaphragm or aperture by rotating the diaphragm ring, and the camera automatically selects the shutter speed for proper automatic exposure. In order, however, for the camera to select the shutter speed, the camera must know the diaphragm or aperture setting. Most lenses have a diaphragm value control lever for transmitting this information to the camera via a diaphragm value lever on the camera body.

To provide a bright viewfinder image, many cameras normally maintain the diaphragm full open until the instant that the picture is taken, at which time the diaphragm is automatically stopped down to the selected or oomputed value.

A common feature of all automatic lenses is that the lens must transmit information to the camera to indicate the fully opened diaphragm value of the lens. Many cameras can also receive from the lens information to indicate the fully opened diaphragm value as well as the fully close diaphragm value of the lens. Some camera manufacturers have adopted a digital system to transmit such information,whereas other camera manufacturers have adopted an analog system for such information.

Such information about the fully opened diaphragm value of the lens is indispensable to automatic operation of the camera and lens. Without this information about the fully opened diaphragm value of the lens, underexposure could frequently occur if the camera, or the user, selected a diaphragm value lower than the capability of the lens.

While these various automatic features and controls have preserved the individuality of the camera manufacturer's products, they have caused severe production problems for interchangeable lens makers who market lenses for such cameras, at comparatively low prices.

The problems with production by the interchangeable lens makers results from the fact that the same construction of lens must be provided with various different lens mounts to correspond to the different manufacturers of cameras, and in the past, different fully opened diaphragm values information systems or fully opened diaphragm value and fully closed diaphragm value information systems required additional lenses.

These many different features of different camera manufacturers have also presented severe inventory and stocking problems in camera stores. As a result, such dealers tend to stock lenses only for the more popular cameras, and often do not stock lenses for less popular cameras because of the inventory required. As a result, sales of less popular cameras have decreased, and the gap between the popular and less popular cameras has become greater.

Recently, several camera manufacturers have adopted a common lens mount known as a "K-mount" (K-type bayonnet mount) which permits mounting the same lens on cameras of different manufacturers. Although it is possible to use an interchangeable lens on cameras with the same mount, using a lens made for one camera on another camera, often does not provide for automatic operation. When using such an interchangeable lens on a different camera, the lens is usable only in a "manual mode" in that it is necessary for the user to determine and set both the diaphragm and the shutter speed, or at the very least, to preset the diaphragm. It is practically impossible, when using a lens from one camera on a different manufacturer's camera, to attain shutter priority automatic exposure or program automatic exposure because of the different controls and information transfer arrangements of different cameras.

SUMMARY OF THE INVENTION

This invention provides a fully automatic diaphragm interchangeable lens universably usable for various makes of cameras with the same type of lens mount or with a mount to which the lens can be adapted.

As indicated above, when using an interchangeable lens camera in the mode of automatic diaphragm control, with an interchangeable lens, information of the fully opened diaphragm value, or the fully opened and fully closed diaphragm value is indispensable. This information is transmitted to the camera body as either digital information or analog information depending on the automatic exposure control system of the camera, through electrical contacts on the rear of the lens.

It has been found that the digital and electrical contacts as well as the contacts for switching the camera to the automatic mode of operation are at different positions on the camera body.

In accordance with the invention, the fully automatic interchangeable lens is provided with a first circuit for providing a digital signal to a camera body indicative of at least the fully opened diaphragm value of the lens, a second circuit for providing an analog signal to a camera body indicative of at least the fully opened diaphragm value of the lens, and a switch for providing switching information to the camera body to cause the camera body to operate in the automatic diaphragm control mode. This information is transmitted to the camera body, from the lens, through contacts on the rear of the lens and which are positioned to mate with contacts on the camera bodies of several different camera manufacturers.

In the preferred embodiments, the switch for switching the camera to the automatic operation mode is preferably actuated in response to rotation of the diaphragm operating ring to an automatic control position beyond the fully closed position of the diaphragm ring.

It is correspondingly an object of the invention to provide a fully automatic diaphragm control interchangeable lens which can be used with cameras of different manufacturers.

It is another object of the invention to provide a fully automatic diaphragm control interchangeable lens which can be used with camera bodies having either a digital lens information transmitting system or an analog lens information transmitting system.

It is an additional object of the invention to provide a fully automatic diaphragm control interchangeable lens which can be used as a manual lens on any camera to which it can be fitted, can be used as a fully automatic lens on a camera having a digital lens information transmitting system, and can be used on a camera having an analog lens information transmitting system.

Other objects and features of the invention will become apparent from the following detailed description and the accompanying drawings.

DETAILED DESCRIPTION

Figure 1:
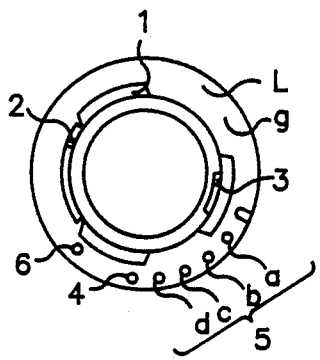
FIG. 1 is a rear view of a fully automatic lens according to the invention.

FIG. 1 shows the back of a lens L, according to the invention. The back or rear of the lens is that part of the lens that seats on the camera when the lens is attached to a camera. The lens L shown at FIG. 1 has a conventional K-mount for mounting the lens on a camera body with a compatible or mating mount.

The lens L is provided with the usual diaphragm, and a rotatable diaphragm operating member usually in the form of a ring on the lens, for manually setting the aperture of the lens.

Projecting from the rear of the lens, as shown at FIG. 1, is a diaphragm value lever 2, and a diaphragm operating or setting lever 3. As is well known in the camera lens art, the diaphragm value lever 2 cooperates with a diaphragm information lever 2' (FIG. 5) on the camera body to transmit to the camera the value or aperture of the diaphragm which is manually set by rotating the diaphragm ring. The diaphragm lever 3 of the lens cooperates with a diaphragm setting lever 3' of the camera body to enable the camera body to automatically set the diaphragm or aperture at the instant a picture is taken, when the camera is in the automatic exposure mode. In most cameras, the diaphragm setting lever 3' also normally maintains the diaphragm full open, until the instant a picture is taken, which provides a brighter image in the viewfinder and provides for light metering by the camera with a fully open aperture.

Lens L has a circular metal plate 9 at the rear of the lens which faces toward and engages the front surface of the camera body. Provided on this plate is a series of electrical contacts or terminals 4, 5, and 6. There are four contacts 5 which are labelled a, b, c, and d. Each of these contacts 4, 5, and 6 takes the form of a spring urged pin in insulated relation to plate 9, as shown for the contacts 4 and 6 at FIG. 4.

The contact or pin 4 is an automatic-manual mode information transmitting pin. The contacts 5, i.e. a, b, c, and d, are digital signal output pins which transmit to a camera body digital signals indicative of both the fully opened diaphragm value and the fully closed diaphragm value of the lens. As will be explained later, some camera bodies only require information about the fully opened diaphragm value of the lens in which instance, only the pins a, b, and c are actually used and connected to the camera body.

The pin 6 is an analog signal transmitting pin for transmitting to a camera body which requires an analog signal, information indicative of the fully opened and fully closed diaphragm values of the lens, or only the fully opened diaphragm value of the lens, depending on the construction of a camera body.

Figure 2:
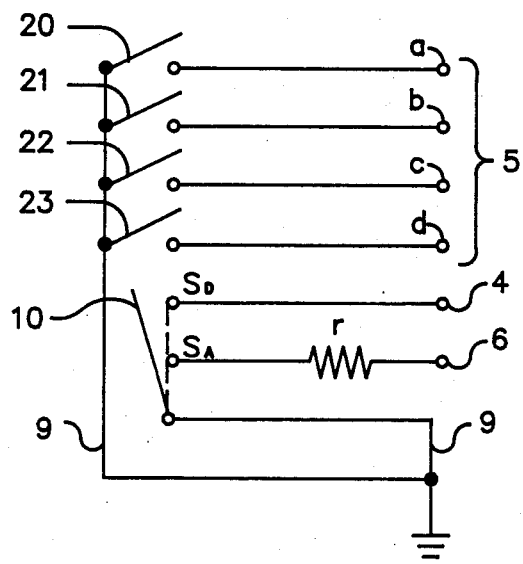
FIG. 2 is a schematic diagram showing the circuit arrangement within the lens of FIG. 1.

FIG. 2 shows the circuit arrangement within the lens L. As shown, the digital information contacts or pins a, b, c, and d are arranged to be selectively connected to the plate 9 which forms a common or ground connector between lens L and the camera body. Also connected to plate 9 is a movable switch arm 10. The switch arm 10 is arranged to simultaneously engage a contact SD and a contact SA. Contact SD is connected to terminal pin 4 and contact SA is connected to terminal pin 6 via a resistor r.

Figure 3:
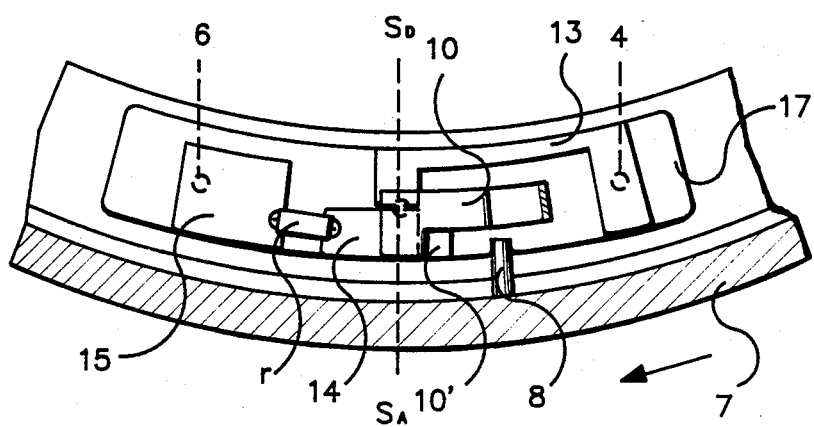
FIG. 3 is a partial enlarged rear view of the lens with portions removed, showing the details of the switch and circuitry within the lens.

The actual construction of a portion of the circuit of FIG. 2 is shown at FIG. 3. For reference purposes, FIG. 3 shows the location of the terminal pins 4 and 6 in dotted lines. These pins 4 and 6 are actually above the plane of the paper of FIG. 3.

As shown at FIG. 3, there is a manual diaphragm adjusting ring 7 rotatably mounted on the lens. Fixed to ring 7 is a switch pin 8 which moves when the ring is rotated. The movable contact 10 is mounted on an insulating plate 17 and has a tail or rear portion 24 which engages the metal plate 9. A conductor 13 in the form of a metal plate is mounted on insulator 17 and pin 4 is electrically connected to the conductor 13 by a metal compression spring 12 which also urges the pin outwardly to the position shown at FIG. 4. Pin 4 is mounted in plate 9 within an insulator 18 so that the pin is electrically insulated from the plate 9.

Figure 4:
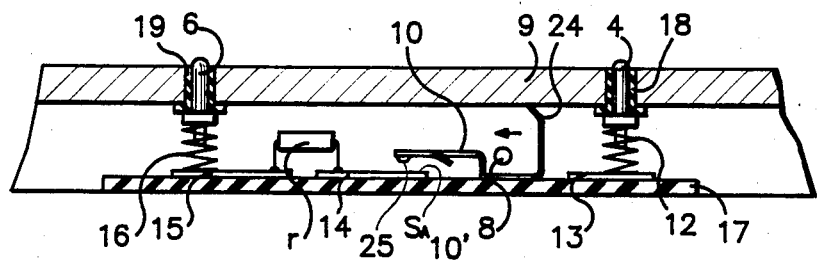
FIG. 4 is a partial sideview in section of the switch and circuitry of FIG. 3.

The contact SD is formed on conductor 13. Another conductor 14 in the form of a conducting metal plate provides the contact SA. A metal plate 15 is provided on insulating plate 17 in opposed relation to the pin 6 and is electrically connected to the pin by a metal compression spring 16 which normally urges pin 6 outwardly, as shown at FIG. 4. Connected between the plates 14 and 15 is a resistor r.

The movable contact 10 has a contact button 25 which extends to a position to overlap the contacts SA and SD when the contact 10 is depressed. Such depressing or closing of the contact 10 occurs as a result of rotation of diaphragm ring 7 in a clockwise direction (as viewed at FIG. 3) so that the operating pin 8 engages tab 10' and presses the contact button 25 downwardly against the contacts SA and SD.

In the position of the operating pin 8 and diaphragm ring 7 shown at FIG. 3, the diaphragm is in its smallest aperture position. Further rotation of diaphragm ring 7 beyond this lowest aperture position results in actuation of the contact 10.

As previously indicated, for an automatic lens to be used to full advantage with an automatic camera, it is necessary to transmit to the camera from the lens information indicative of the values of the fully opened diaphragm and fully closed diaphragm of the lens. Where the camera body is of the type which requires digital information, the pins a, b, c, and d transmit this information from the lens to the camera body. The actual information provided by the lens to the camera body will depend on the digital code signals require by the camera body. Table 1 shows digital signal coding of a known camera body which requires information about the fully opened and fully closed diaphragm values of the lens. For a lens with a fully opened value F2, and a fully closed value F 22, the digital signal is 0000. This is the state shown at FIG. 2 where switches 20–23 are all opened. For a lens with a full open diaphragm value of F3.5 and a fully closed value of F22, the digital signal is 0110. Such a digital signal is provided by closing the switches 21 and 22. It is to be appreciated that switches 20–23 will not be used in the actual lens constructed by the lens maker. Instead, conductors extending from the pins a, b, c, and d will either be provided or not provided depending on the required code.

Some camera bodies only require information about the fully opened diaphragm value of the lens. Representative signals required by a known camera body of this type are shown at Table 2. It is to be noted that the digital signals a, b, and c of Table 2 correspond to the digital signals a, b, and c of Table 1 if the column d of Table 1 is eliminated. Correspondingly, The same lens with the same digital coding can be used, in accordance with the invention with camera bodies which require only the fully opened diaphragm value information as well as with camera bodies which require both fully opened and fully closed diaphragm value information.

Instead of digital fully opened or fully closed diaphragm values, some camera bodies require analog values. Typical analog values of a known camera body are listed in Table 3. If the lens, for example, as a fully open diaphragm value F 2.5 and a fully closed diaphragm value F 32, the lens maker installs a resistor r equal to the value r4 of 11.6 K ohms.

Some camera bodies only require analog diaphragm information for the fully opened diaphragm value of the lens. Typical values of a known camera body are shown at Table 4. It will be noticed from Tables 3 and 4 that a lens with a fully open diaphragm value F 2 and a fully closed diaphragm value F 22 has a resistance r equal to rl, of 6.7 K ohms. This is the same value as that required for a camera body which requires only the fully opened diaphragm value, as shown at Table 2 for a fully opened value of F 2. Correspondingly, such an F 2 lens can be used with camera bodies having either analog system. Other lenses of Table 3 which provide fully opened and fully closed diaphragm values are not, however, usable with camera bodies having the resistance requirements of Table 4. Correspondingly, separate lenses must be provided by the lens maker.

The lenses with the analog information coding of Table 3 can, however, be used with a camera body which requires only fully opened diaphragm values, if such a camera body is electrically constructed to interpret a resistance range as indicative of the fully opened diaphragm value. Table 5 indicates these ranges of values which it will be noticed correspond to the respective fully opened diaphragm resistance values of Table 3.

Operation of a typical lens L according to the invention with several different camera bodies will now be explained. Assuming that the lens has a fully opened diaphragm value of F 2.5 and a fully closed diaphragm value of F 22, terminal pin c will be electrically connected to plate 9 to provide the digital signal 0010 of Table 1. This same lens will be provided with a resistor r equal to the value r3 of 9.6 K ohms, indicated at Table 3. The remainder of the circuitry in the lens is the same as shown at FIG. 2.

Figure 5:
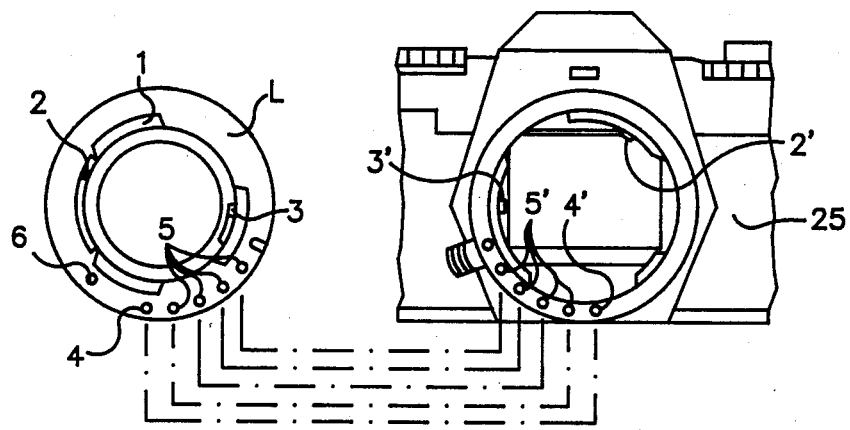
FIG. 5 is a schematic view of a lens according to the invention and a camera body of the type which requires digital signal lens information, and the cooperating electrical contacts thereof.

FIG. 5 shows the cooperation of lens L with a camera body which requires digital fully opened diaphragm value and fully closed diaphragm value information. As shown, the camera body 25 has contact pins or terminals 5' which mate with the terminals 5 on the lens. There is also an automatic switching information receiving terminal 4' on the camera body which cooperates with the switching information termal 4 on the lens. When the lens according to the invention is installed on camera body 25, the analog terminal 6 is simply inactive, When it is desired to use the camera body 25 in a fully automatic mode, the diaphragm ring 7 is rotated to a position beyond the fully closed diaphragm position so that switch 10 is closed, as previously explained. This completes a circuit through pin 4 to plate 9 and thus switches the camera body to full automatic operation. The digital signals from the terminal pins 5 transmit to the camera body the fully opened and fully closed diaphragm values which are necessary for automatic operation of the camera body.

Figure 6:
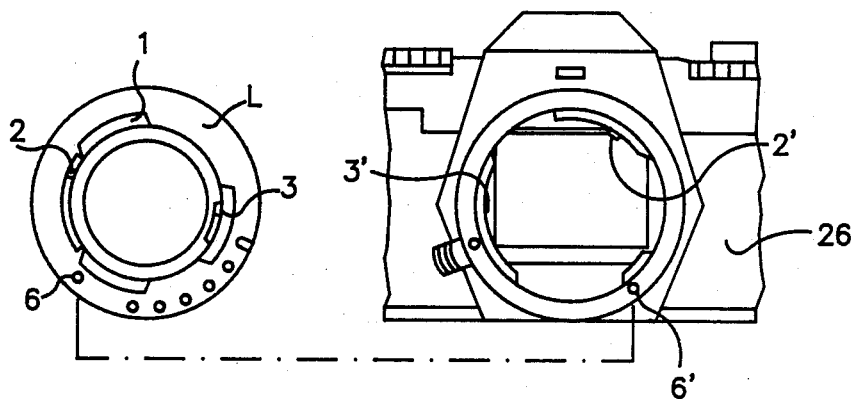
FIG. 6 is a schematic view of a lens according to the invention and a camera body of the type which requires analog signal lens information, and the cooperating electrical contacts thereof.

FIG. 6 shows the cooperation of lens L with a camera body which requires analog information to define the fully opened and fully closed diaphragm values. The camera body 26 has an analog information receiving pin 6' which connects with the analog information sending pin 6 on lens L when the lens is mounted on the camera body 26. When used on the camera body 26, the digital pins 4 and 5 do not transmit any information.

The operation of the lens L on the camera body 26 is the same from the standpoint of the user as when used on camera body 25. To signal the camera for automatic operation, the diaphragm ring is rotated beyond the fully closed diaphragm position to close switch 10. This connects resistor r to plate 9 and sends the analog information to the camera body 26 through the pin 6'. When the lens ring 8 is rotated to a manually selected aperture position, the switch 10 opens, since the analog information is no longer required.

TABLE 1

| Fully Opened Diaphragm Value | Fully Closed Diaphragm Value | Digital Signal a b c d |
|---|---|---|
| F 2 | F 2 2 | 0 0 0 0 |
| F 2 | F 3 2 | 0 0 0 1 |
| F 2.5 | F 2 2 | 0 0 1 0 |
| F 2.5 | F 3 2 | 0 0 1 1 |
| F 2.8 | F 2 2 | 0 1 0 0 |
| F 2.8 | F 3 2 | 0 1 0 1 |
| F 3.5 | F 2 2 | 0 1 1 0 |
| F 3.5 | F 3 2 | 0 1 1 1 |
| F 4 | F 2 2 | 1 0 0 0 |
| F 4 | F 3 2 | 1 0 0 1 |
| F 4.5 | F 2 2 | 1 0 1 0 |
| F 4.5 | F 3 2 | 1 0 1 1 |
| F 5.6 | F 2 2 | 1 1 0 0 |
| F 5.6 | F 3 2 | 1 1 0 1 |

TABLE 2

| Fully Opened Diaphragm Value | Digital Signal a b c |
|---|---|
| F 2 | 0 0 0 |
| F 2.5 | 0 0 1 |
| F 2.8 | 0 1 0 |
| F 3.5 | 0 1 1 |
| F 4 | 1 0 0 |
| F 4.5 | 1 0 1 |
| F 5.6 | 1 1 0 |

TABLE 3

| Fully Opened Diaphragm Value | Fully Closed Diaphragm Value | Analog Signal Resistance r (K Ω) |
|---|---|---|
| F 2 | F 2 2 | r1 = 6.7 |
| F 2 | F 3 2 | r2 = 8.0 |
| F 2.5 | F 2 2 | r3 = 9.6 |
| F 2.5 | F 3 2 | r4 = 11.6 |
| F 2.8 | F 2 2 | r5 = 13.9 |
| F 2.8 | F 3 2 | r6 = 16.7 |
| F 3.5 | F 2 2 | r7 = 20.0 |
| F 3.5 | F 3 2 | r8 = 24.0 |
| F 4 | F 2 2 | r9 = 28.8 |
| F 4 | F 3 2 | r10 = 34.6 |
| F 4.5 | F 2 2 | r11 = 41.5 |
| F 4.5 | F 3 2 | r12 = 49.8 |
| F 5.6 | F 2 2 | r13 = 59.7 |
| F 5.6 | F 3 2 | r14 = 71.7 |

TABLE 4

| Fully Opened Diaphragm Value | Analog Signal Resistance r (K Ω) |
|---|---|
| F 2 | r1 = 6.7 |
| F 2.5 | r2 = 8.0 |
| F 2.8 | r3 = 9.6 |
| F 3.5 | r4 = 11.6 |
| F 4 | r5 = 13.9 |
| F 4.5 | r6 = 16.7 |
| F 5.6 | r7 = 20.0 |

TABLE 5

| Fully Opened Diaphragm Value | Analog Signal Resistance r (K Ω) |
|---|---|
| F 2 | r1 = 6.7 to 8.0 |
| F 2.5 | r2 = 9.6 to 11.6 |
| F 2.8 | r3 = 13.9 to 16.7 |
| F 3.5 | r4 = 20.0 to 24.0 |
| F 4 | r5 = 28.8 to 34.6 |
| F 4.5 | r6 = 41.5 to 49.8 |
| F 5.6 | r7 = 59.7 to 71.7 |

Figure 7:
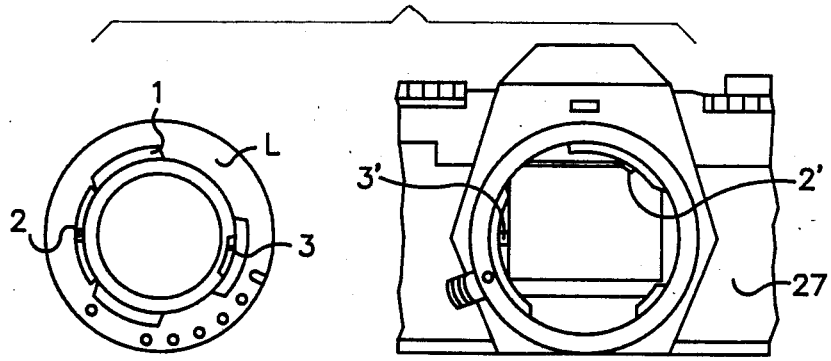
FIG. 7 is a schematic view of a lens according to the invention and a non-automatic camera body with which the lens can also be used.

FIG. 7 shows the lens L used on a camera body without automatic features. In this instance, only the diaphragm information lever and the diaphragm lever 3 coact with the corresponding levers 2' and 3' on the camera body. This provides only for manual adjustment of the diaphragm and will also require manual selection of the shutter speed. Depending on the camera, the appropriate shutter speed for a particular diaphragm setting may be indicated by the camera so that the user can set the shutter speed for correct exposure.

It is to be appreciated that the diaphragm information lever and diaphragm lever cooperate in the same way with the automatic cameras 25 and 26 as they do with the manual camera 27.

Correspondingly, in accordance with the invention, Applicant has provided a lens which can be used with at least several different types of camera bodies including those which require digital fully opened and fully closed diaphragm values, those which require analog information of fully opened and fully closed diaphragm values, and those which require only fully opened diaphragm values in either digital or analog form.

While switches 20-23 have been shown at FIG. 2 in the digital circuitry of pins a, b, c, and d, it is to be understood that in the manufactured lens, the digital coding will be provided by either the absence or presence of a conductor. It is also to be appreciated that depending on the camera body, the coding may be reversed with an insulator replacing a conductor, depending on the camera body construction.

Correspondingly, the lens maker need only make one lens to use with various automatic and manual camera bodies, and the dealer only need to stock one such lens, in accordance with the invention, to sell for use with such various bodies.

While a preferred embodiment has been shown and described, numerous changes can be made without departing from the scope of this invention.

I claim:

1. An interchangeable variable aperture lens for use as an automatic lens with a camera body using digital signal control and with a camera body using analog signal control, and as a manual lens, said lens comprising, mounting means for mounting the lens on different camera bodies including at least a digital signal using body and at least an analog signal using body, an adjustable aperture defining diaphragm in said lens for varying the aperture of the lens, a rotatable diaphragm adjusting member on the lens for manually adjusting the aperture of the lens, a diaphragm operating lever on the lens for automatic adjustment of the aperture of the lens by a camera body, a diaphragm value control lever for transmitting to the camera body information indicative of the aperture set by manual rotation of the rotatable diaphragm adjusting member, first circuit means on said lens for providing, to a camera body using digital signal control, a digital signal indicative of a fully opened diaphragm value of the lens, second circuit means on said lens for providing, to a camera body using analog signal control, an analog signal indicative of a fully opened diaphragm value of the lens, switch means on said lens reponsive to rotation of said adjusting member to an automatic mode position beyond a smallest aperture defining position of the member, for providing a signal to a camera body to switch to an automatic control mode of operation.

2. An interchangeable lens according to claim 1 wherein said digital signal further comprises a digital signal indicative of a fully closed diaphragm value of the lens.

3. An interchangeable lens according to claim 1 wherein said analog signal further comprises an analog signal indicative of a fully closed diaphragm value of the lens.

4. An interchangeable lens according to claim 3 wherein said digital signal further comprises a digital signal indicative of a fully closed diaphragm value of the lens.

5. An interchangeable automatic lens according to claim 1 wherein said first circuit means comprises a plurality of electrical contacts on said lens positioned to engage mating digital information receiving contacts of a camera body upon mounting the lens on the camera body.

6. An interchangeable automatic lens according to claim 5 wherein said second circuit means comprises at least one contact positioned to engage a mating analog information receiving contact of a camera body upon mounting the lens on the camera body.

7. An interchangeable lens according to claim 6 wherein said second circuit means includes a resistor of a value indicative of the fully opened diaphragm value of a lens, and said switch means, in said automatic mode position, electrically connects said resistor to a camera body.

* * * * *